US006773629B2

(12) United States Patent
Le Mercier et al.

(10) Patent No.: US 6,773,629 B2
(45) Date of Patent: Aug. 10, 2004

(54) COMPOUND BASED ON AN ALKALINE-EARTH METAL, SULPHUR AND ALUMINIUM, GALLIUM OR INDIUM, ITS METHOD OF PREPARATION AND ITS USE AS A PHOSPHOR

(75) Inventors: Thierry Le Mercier, Paris (FR); Olivier Le Roux, Rosny-sous-Bois (FR)

(73) Assignee: Rhodia Electronics and Catalysis, La Rochelle Cedex (FR)

( * ) Notice: Subject to any disclaimer, the term of this patent is extended or adjusted under 35 U.S.C. 154(b) by 0 days.

(21) Appl. No.: 09/948,761

(22) Filed: Sep. 10, 2001

(65) Prior Publication Data

US 2002/0190241 A1 Dec. 19, 2002

(30) Foreign Application Priority Data

Jun. 13, 2001 (FR) .............................. 01 07733

(51) Int. Cl.[7] .......................... C09K 11/56; C09K 11/55
(52) U.S. Cl. ................................. 252/301.4 S
(58) Field of Search .................... 252/301.4 S

(56) References Cited

U.S. PATENT DOCUMENTS

| 5,505,986 | A | | 4/1996 | Velthaus et al. | |
|---|---|---|---|---|---|
| 5,747,929 | A | * | 5/1998 | Kato et al. | 313/503 |
| 5,773,085 | A | | 6/1998 | Inoue et al. | |
| 6,180,073 | B1 | * | 1/2001 | Huguenin et al. | 423/155 |
| 2002/0149001 | A1 | * | 10/2002 | Ellens et al. | 252/301.4 S |

FOREIGN PATENT DOCUMENTS

| JP | 2-72592 | * | 3/1990 |
|---|---|---|---|
| WO | 01/95400 A1 | | 12/2001 |

OTHER PUBLICATIONS

K. T. Le Thi et al., "Investigation of the $MS$–$Al_2S_3$ systems (M= Ca, Sr, BA) and luminescence properties of europium-doped thioaluminates", *Materials Science&Engineering B14* (1992), pp. 393–397.

M. R. Davolos et al., "Luminescence of $Eu^{2+}$ in Strontium and Barium Thiogallates", *Journal of Solid State Chemistry*, 83, (1989), pp. 316–323.

* cited by examiner

*Primary Examiner*—C. Melissa Koslow
(74) *Attorney, Agent, or Firm*—Burns, Doane, Swecker & Mathis, L.L.P.

(57) ABSTRACT

The invention relates to a compound based on at least one element A chosen from alkaline-earth metals, on at least one element B chosen from aluminium, gallium and indium, on sulphur and on a dopant capable of giving the compound luminescence properties, which is characterized in that it is in the form of a mixture of predominantly an $AB_2S_4$-type crystallographic phase and a $B_2S_3$-type crystallographic phase. This compound is prepared by a method in which a solution or suspension comprising salts or sols of the elements A, B and of the dopant is formed in a proportion such that the B/(A+dopant) atomic ratio is at least 2.06; the solution or suspension is spray-dried; the product thus obtained is sulphurized. This compound may be used as a phosphor, especially in cathodoluminescence.

7 Claims, 2 Drawing Sheets

COMPOUND BASED ON AN ALKALINE-EARTH METAL, SULPHUR AND ALUMINIUM, GALLIUM OR INDIUM, ITS METHOD OF PREPARATION AND ITS USE AS A PHOSPHOR

The present invention relates to a compound based on an alkaline-earth metal, sulphur and aluminium, gallium or indium, its method of preparation and its use as a phosphor.

At the present time there have been major developments in the fields of luminescence and electronics. As an example of such developments, mention may be made of the development of cathodoluminescent systems for new display and illumination techniques. A specific application is that of the replacement of current television screens with flat screens. These new applications require phosphors having increasingly improved properties.

Known phosphors include, in particular, alkaline-earth metal thiogallates. These products may especially be prepared by spray-drying a solution or suspension of the constituent elements of the thiogallate other than sulphur, and then by sulphurizing the spray-dried product. The products obtained in this way already have good luminescence properties.

It is an object of the invention to further improve these properties.

To this end, the compound of the invention is a compound based on at least one element A chosen from alkaline-earth metals, on at least one element B chosen from aluminium, gallium and indium, on sulphur and on a dopant capable of giving the said compound luminescence properties, and it is characterized in that it is in the form of a mixture of predominantly an $AB_2S_4$-type crystallographic phase and a $B_2S_3$-type crystallographic phase.

The invention also relates to a method of preparing such a compound, which is characterized in that it comprises the following steps:

- a solution or suspension containing salts or sols of the elements A, B and of the dopant is formed, in a proportion such that the B/(A+dopant) atomic ratio is at least 2.06;
- the solution or suspension is spray-dried; and
- the product obtained in the previous step is sulphurized.

Finally, the invention relates to the use as a phosphor, especially in cathodoluminescence, of a compound as described above.

Figure 1:
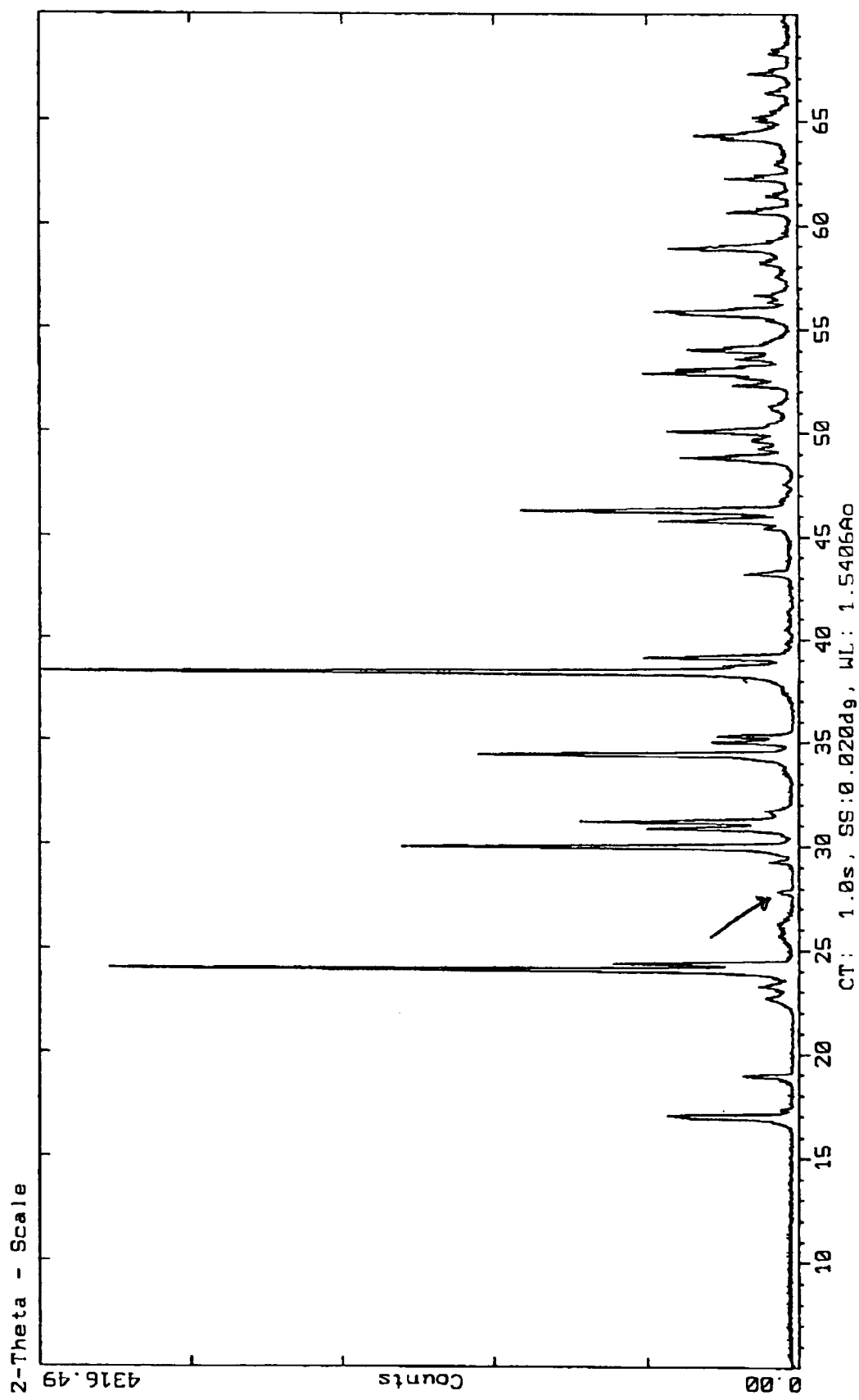
Figure 2:
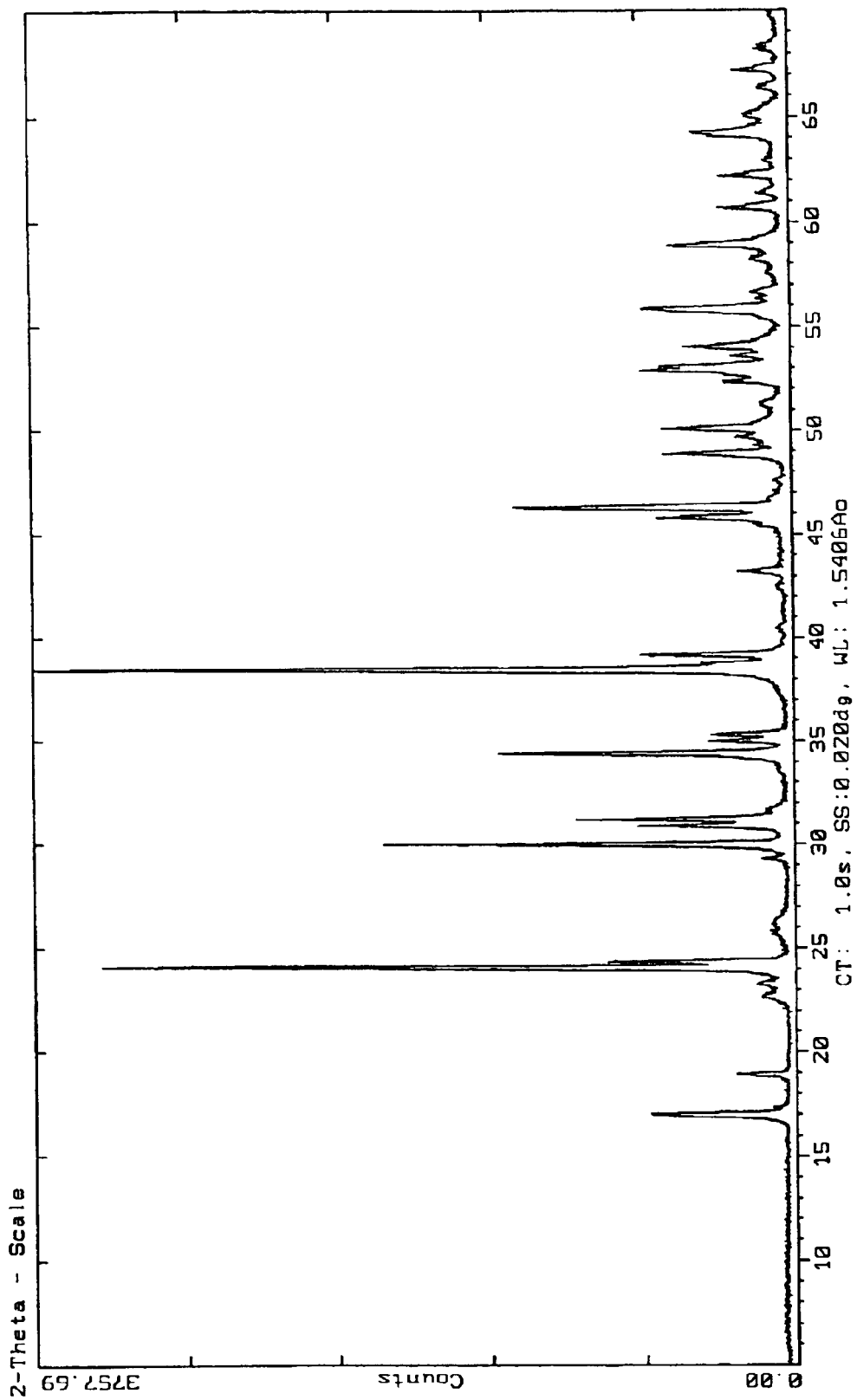

Further features, details and advantages of the invention will become more fully apparent on reading the description which follows and from the appended drawing in which:

FIG. 1 is an X-ray pattern obtained from a compound according to the invention; and FIG. 2 is an X-ray pattern obtained from a compound according to the prior art.

The Periodic Table of Elements to which reference will be made throughout the description is established in "Supplément au Bulletin de la Société Chimique de France" [*Supplement to the Bulletin of the Chemical Society of France*], No. 1 (January 1966).

As mentioned above, the compound of the invention is based on the elements A, B, sulphur and a dopant.

A is an alkaline-earth metal (Group IIA of the Periodic Table).

Most particularly, A may be strontium. A may also be magnesium, calcium or barium.

B may be aluminium, gallium or indium. More particularly, B may be gallium.

The invention also relates to the compounds in which A represents several alkaline-earth metals. Likewise, B may represent a combination of at least two of the elements aluminium, gallium and indium.

The compound of the invention includes one or more dopants. The term "dopant" is understood here to mean any element capable of giving the compound of the invention luminescence properties. These dopants are well known in the technique involved here. Without wishing to be limited by any theory, it may be thought that the dopant substitutes for the alkaline-earth metal A. The amount of dopant is usually at most 10 at % with respect to the alkaline-earth element. More particularly, this dopant may be chosen from divalent manganese, from divalent rare-earth metals and from the group comprising the trivalent rare-earth metals in combination with an alkali metal. In the case of trivalent rare-earth metals, the presence of an alkali metal.

The term "rare earth metals" is understood to mean elements from the group consisting of yttrium and those elements of the Periodic Table having atomic numbers lying between 57 and 71 inclusive.

The dopant may more particularly be europium$^{II}$, ytterbium$^{II}$ or cerium$^{III}$ in combination with an alkali metal.

According to one particular embodiment, the compound of the invention is a doped strontium thiogallate, it being possible for this dopant to be most particularly europium$^{II}$.

The essential characteristic of the compound of the invention is its crystallographic structure as demonstrated by X-ray diffraction. More specifically, the compound of the invention has predominantly an $AB_2S_4$-type crystallographic phase and a $B_2S_3$-type crystallographic phase. The respective proportions of these phases may vary. The $B_2S_3$-type phase must be present in a proportion sufficient to be able to be detected in an X-ray pattern.

This proportion of the $B_2S_3$ phase will depend on the respective amounts of the elements A, B and of dopant used in preparing the compound. Thus, the compound of the invention may be obtained by a process in which the elements A, B and the dopant are used in a proportion such that the B/(A+dopant) atomic ratio is at least 2.06, preferably at least 2.1. More particularly, this ratio may be between 2.06 and 2.25.

The compound of the invention may furthermore have a number of additional characteristics, which will now be described.

The compound may consist of particles having a mean size of at most 10 μm. Throughout the description, the particle size and size distribution characteristics are measured using the laser diffraction technique (distribution by volume).

According to an advantageous variant of the invention, the compound may have a narrow particle size distribution. Thus, the dispersion index σ/m is at most 0.7. More particularly, it may be at most 0.6.

The term "dispersion index" is understood to mean the ratio:

$$\sigma/m = (d_{84} - d_{16})/2d_{50}$$

in which:

$d_{84}$ is the particle diameter for which 84% of the particles have a diameter of less than $d_{84}$;

$d_{16}$ is the particle diameter for which 16% of the particles have a diameter of less than $d_{16}$; and $d_{50}$ is the mean particle diameter.

The compounds of the invention may consist of particles having an approximately spherical shape and the diameter of which corresponds to the mean sizes given above.

According to another variant of the invention, the compound of the invention may have a low residual oxygen content. This residual content may be at most 1.5%, more particularly at most 1%. It is expressed as weight of oxygen with respect to the total weight of the compound.

According to yet another variant of the invention, the particles constituting the compound may also include a transparent oxide coating layer, this layer being preferably uniform and of controlled thickness.

The term "transparent oxide" is understood to mean here an oxide which, once it has been deposited on the particle in the form of a relatively thin film, absorbs little or no light within the visible range. Furthermore, it should be noted that the term "oxide", which is used for convenience throughout the present description relating to this variant, must be understood as also encompassing oxides of the hydrated type.

These oxides, or hydrated oxides, may be amorphous and/or crystalline.

By way of examples of such oxides, mention may more particularly be made of silicon oxide (silica), aluminium oxide (alumina), zirconium oxide (zirconia), titanium oxide (titania), zirconium silicate $ZrSiO_4$ (zircon) and rare-earth metal oxides. According to a preferred variant, the coating layer is based on silica. Even more advantageously, this layer essentially, and preferably only, consists of silica.

One method of preparing the compound of the invention will now be described.

The first step of this method consists in forming a solution or suspension comprising salts or sols of the elements A, B and of the dopant.

Normally used are inorganic salts, such as nitrates, sulphates or chlorides, or else hydroxides. Optionally, organic salts may be used, but it is preferable in this case to employ salts having few carbon atoms, such as acetates.

The salts are put into a liquid medium, preferably water, in order to form a solution or suspension.

As indicated above, and so as to obtain a compound having a $B_2S_3$ crystallographic phase, an amount of reactants is used such that the element B is in excess with respect to the stoichiometry. More specifically, the B/(A+dopant) atomic ratio must be at least 2.06, preferably at least 2.1. More particularly, this ratio may be between 2.06 and 2.25.

The next step consists in drying the suspension or solution prepared beforehand. This drying is performed by spraying.

The expression "spray drying" is understood to mean drying by spraying the mixture into a hot atmosphere. The spraying may be performed by means of any sprayer known per se, for example a spray nozzle of the sprinkler-rose type or another type. It is also possible to use atomizers called turbine atomizers. With regard to the various spraying techniques that can be used in the present method, reference may especially be made to the fundamental work by Masters entitled "*Spray drying*" (second edition, 1976, published by George Godwin, London).

It should be noted that it is also possible to employ the spray-drying operation by means of a "flash" reactor, for example of the type developed by the Applicant and described for example in French Patent Applications Nos. 2 257 326, 2 419 754 and 2 431 321. In this case, the treating gases (hot gases) are given a helical motion and flow into a vortex well. The mixture to be dried is injected along a path coincident with the axis of symmetry of the helical paths of the said gases, thereby allowing the momentum of the gases to be completely transferred to the mixture to be treated. In fact, the gases thus fulfil two functions: firstly, the function of spraying the initial mixture, that is to say converting it into fine droplets, and secondly, the function of drying the droplets obtained. Moreover, the extremely short residence time (generally less than about ⅒th of a second) of the particles in the reactor has the advantage, among others, of limiting any risk of them being overheated as a result of being in contact with the hot gases for too long a time.

With regard to the flash reactor mentioned above, reference may especially be made to FIG. 1 of French Patent Application 2 431 321.

This reactor consists of a combustion chamber and a contact chamber composed of a double cone or a truncated cone whose upper part diverges. The combustion chamber runs into the contact chamber via a narrow passage.

The upper part of the combustion chamber is provided with an opening allowing the combustible phase to be introduced.

Moreover, the combustion chamber includes a coaxial internal cylinder, thus defining, inside the combustion chamber, a central region and an annular peripheral region, having perforations located mostly towards the upper part of the apparatus. The chamber has a minimum of six perforations distributed over at least one circle, but preferably over several circles which are spaced apart axially. The total surface area of the preparations located in the lower part of the chamber may be very small, of the order of ⅒th to ¹⁄₁₀₀ths of the total surface area of the perforations of the said coaxial internal cylinder.

The perforations are usually circular and of very small thickness. Preferably, the ratio of the perforation diameter to the wall thickness is at least 5, the minimum wall thickness being only limited by the mechanical requirements.

Finally, an angled pipe runs into the narrow passage, the end of which opens along the axis of the central region.

The gas phase undergoing a helical motion (hereinafter called the helical phase) consists of a gas, generally airs introduced into an orifice made in the annular region, this orifice preferably being located in the lower part of the said region.

To obtain a helical phase in the narrow passage, the gas phase is preferably introduced at low pressure into the aforementioned orifice, that is to say at a pressure of less than 1 bar and more particularly at a pressure of between 0.2 and 0.5 bar above the pressure existing in the contact chamber. The velocity of this helical phase is generally between 10 and 100 m/s and preferably between 30 and 60 m/s.

Moreover, a combustible phase, which may especially be methane, is injected axially via the aforementioned opening into the central region at a velocity of about 100 to 150 m/s.

The combustible phase is ignited, by any known means, in that region where the fuel and the helical phase come into contact with each other.

Thereafter, the flow imposed on the gases in the narrow passage takes place along a number of paths coincident with families of generatrices of a hyperboloid. These generatrices are based on a family of small-sized circles or rings located close to and below the narrow passage, before diverging in all directions.

Next, the mixture to be treated in liquid form is introduced via the aforementioned pipe. The liquid is then divided into a multitude of drops, each drop being transported by a volume of gas and subjected to a motion creating a centrifugal effect. Usually, the flow rate of the liquid is between 0.03 and 10 m/s.

The ratio of the proper momentum of the helical phase to that of the liquid mixture must be high. In particular, it is at least 100 and preferably between 1,000 and 10,000. The momenta in the narrow passage are calculated based on the input flow rates of the gas and of the mixture to be treated, and on the cross section of the said passage. Increasing the flow rates increases the size of the drops.

Under these conditions, the proper motion of the gases is imposed, both in its direction and its intensity, on the drops of the mixture to be treated, these being separated from one another in the region of convergence of the two streams. The velocity of the liquid mixture is, in addition, reduced to the minimum needed to obtain a continuous flow.

The spray drying is generally carried out with a solid output temperature of between 90° C. and 300° C.

The product thus obtained from the spray drying may possibly be deagglomerated, for example by micronizing.

The final step of the method consists in sulphurizing the product obtained from the drying.

This sulphurization may be carried out by making the product obtained in the previous step react with carbon disulphide or hydrogen sulphide, or with a mixture of hydrogen sulphide and carbon disulphide. The sulphurization reaction is carried out at a temperature between 600° C. and 1,000° C., preferably between 800° C. and 900° C.

In the case of a mixture of hydrogen sulphide and carbon disulphide, the respective proportions of $CS_2$ and $H_2S$ may vary widely. The flow rate of the sulphurizing gas ($CS_2$, $H_2S$ or $CS_2/H_2S$) is usually chosen so that the amount of $CS_2$ and/or $H_2S$ injected into the system during the reaction, that is to say between the start of the temperature rise (the start of the thermal cycle) and the end of the high-temperature hold, is sufficient to convert all of the precursor into sulphide. In general, a molar ratio ([sulphurizing gas]/[A]+[B]) greater than 4 allows this requirement to be met.

The sulphurizing gas may be used with an inert gas, such as argon or nitrogen.

The duration of the reaction corresponds to the time needed to obtain the desired sulphide.

After the heating step, the sulphide formed, which constitutes the compound of the invention, is recovered.

In the case of the preparation of a compound according to one of the variants described above and comprising a transparent oxide, the method of preparation essentially consists in bringing the initial compound into contact with a precursor of the aforementioned transparent oxide and in precipitating the transparent oxide. The term "initial compound" is understood to mean the compound as obtained following the method of preparation and of sulphurization described above and after possible deagglomeration.

In the case of silica, mention may be made of the preparation of the silica by hydrolysis of an alkyl silicate, by forming a reaction mixture by mixing water, alcohol, the compound, which is then in suspension, and possibly a base, an alkali metal fluoride or an ammonium fluoride, which may act as catalyst for the condensation of the silicate. The alkyl silicate is then introduced. A preparation may also be made by reaction between the compound, a silicate (of the alkali-metal-silicate type) and an acid.

In the case of an alumina-based layer, the compound, an aluminate and an acid may be made to react, by means of which alumina is precipitated. This precipitation may also be obtained by bringing the compound, an aluminium salt and a base into contact with one another and making them react.

Finally, the alumina may be formed by the hydrolysis of an aluminium alcholate.

With regard to titanium oxide, this may be precipitated by introducing, into a hydroalcoholic suspension of the compound, a titanium salt on the one hand, such as $TiCl_4$, $TiOCl_2$ or $TiOSO_4$, and a base on the other. It is also possible, for example, to hydrolyse an alkyl titanate or to precipitate a titanium sol.

Finally, in the case of a layer based on zirconium oxide, it is possible to cohydrolyse or coprecipitate a suspension of the compound in the presence of a zirconium organometallic compound, for example a zirconium alkoxide, such as zirconium isopropoxide.

The compound of the invention may be used as a phosphor especially in cathodoluminescence, that is to say in applications involving electron-type excitations. In this case, it can be used in the manufacture of any device operating on this principle, such as FED or VFD flat screens, projection screens and television screens. This compound may also be employed as a photoluminescent phosphor, for example in PC-LEDs (phosphor-converted light-emitting diode) in which the excitation may be between 350 nm and 470 nm.

The compounds of the invention are applied in this type of device using well-known techniques, for example by deposition on the screens by sedimentation, screen printing or electrophoresis.

Finally, the invention applies to the aforementioned cathodoluminescent or photoluminescent devices comprising a compound according to the invention.

Examples will now be given.

In these examples, the particle size distribution was determined by the aforementioned laser technique using a Coulter® LS 230 apparatus. It should also be mentioned that the measurement was carried out on a dispersion of the product which was in an aqueous solution containing 0.1% by weight of sodium hexametaphosphate and which was subjected beforehand to an ultrasound probe treatment (20 kHz/120 W probe with a 13 mm diameter tip) for 3 minutes.

Moreover, the conditions under which the photoluminescence of the products was measured were the following.

The photoluminescence measurements were carried out with the aid of a light source which emits between 200 and 800 nm. The measurement apparatus comprised, in excitation mode, a double monochromater placed in front of the specimen so that the excitation of the specimen was monochromatic.

The efficiency measurements were carried out by comparing the intensity of the emission spectra at the maximum of the emission peak (533 nm). The spectral position and shape of the emission spectrum were independent of the chemical composition of the product and of the excitation wavelength throughout the entire spectral range studied. Only the intensity of the spectrum was modified. This emission corresponded to the 4f-5d band of divalent europium in an $SrGa_2S_4$ environment.

The emission spectra were obtained by fixing the excitation wavelength at 254 nm and 460 nm. These spectra were corrected for adsorption by the gratings present in the spectrofluorimeter and for the variation in sensitivity of the photomultiplier.

EXAMPLE 1

This example relates to the preparation of a compound of formula $(Sr_{0.95}Eu_{0.05})Ga_{2.1}S_4$.

A mixture of gallium, strontium and europium nitrates in the proportions corresponding to those of the desired compound was spray-dried in an LEA 100® apparatus of the "flash" reactor type described above. The air input temperature was 500° C., while the air output temperature was 200° C.

40 g of the powder obtained were placed in a silica boat which was then rotated (at 3 rpm) in a sulphurizing furnace. The reaction gas mixture consisted of argon (52 vol %), $CS_2$ (23 vol %) and $H_2S$ (25 vol %). The flow rate of the gas mixture was 1.7 l/min.

The thermal cycle was the following: heating at 8° C./min from room temperature up to 870° C., then holding at this temperature for 10 minutes and then cooling at 5° C./min in argon.

The product was in the form of a powder containing predominantly the $SrGa_2S_4$ phase and traces of the $Ga_2S_3$ phase. The $Ga_2S_3$ phase was detected using X-rays, particularly by its (100) line at 3.20 Å, i.e. 2θ=27.86° using a copper anode of 1.5418 Å wavelength. The corresponding X-ray pattern is that in FIG. 1, the (100) line being identified by an arrow. The mean particle size was 3.4 μm and the dispersion index was 0.6.

COMPARATIVE EXAMPLE 2

The procedure was as in Example 1, but a compound of formula $(Sr_{0.95}EU_{0.05})Ga_2S_4$ was prepared but without excess gallium stoichiometry. The X-ray pattern obtained from the product (FIG. 2) shows that it is a pure phase.

The product of Example 1 had, compared with that of Example 2, a photoluminescence efficiency at 254 nm and 460 nm which is 1.7 times greater for each of these two wavelengths.

EXAMPLES 3 to 5

The procedure was as in Example 1, but the amount of gallium was varied. Thus, in the case of Examples 3, 4 and 5, gallium was used in the proportions corresponding to those of the compounds $(SR_{0.95}Eu_{0.05})Ga_{2+x}S_4$ in which the x values were 0.06, 0.14 and 0.2, respectively.

The products were in the form of a powder containing predominantly the $SrGa_2S_4$ phase and traces of the $Ga_2S_3$ phase. The (100) line from the $Ga_2S_3$ phase detected by X-rays had an intensity which increased when x varied from 0.06 to 0.2.

The photoluminescence yields at 254 nm of these products were compared with that of Example 2. In the case of the products of Examples 3, 4 and 5, that is to say for x values of 0.06, 0.14 and 0.2 respectively, the yield was increased by a factor of 1.6, 1.7 and 1.7, respectively, compared with the product of the comparative example. The yields at 460 nm were increased by the same respective factors.

What is claimed is:

1. A composition of matter based on at least one element A chosen from alkaline-earth metals, on one element B chosen from aluminium, gallium and indium, on sulphur and on a dopant imparting to the composition luminescence properties, and comprising a mixture of predominantly an $AB_2S_4$-type crystallographic phase and a $B_2S_3$-type crystallographic phase,
   wherein the composition is in powder form, and constituent particles of the powder have a mean size of almost 10 μm, and
   wherein the constituent particles of the powder have a spherical shape.

2. A composition of matter based on at least one element A chosen from alkaline-earth metals, on one element B chosen from aluminium, gallium and indium, on sulphur and on a dopant imparting to the composition luminescence properties, and comprising a mixture of predominantly an $AB_2S_4$-type crystallographic phase and a $B_2S_3$-type crystallographic phase,
   wherein the composition is in powder form, and constituent particles of the powder have a mean size of at most 10 μm, and
   wherein the constituent particles of the powder include a transparent oxide coating layer, more particularly a silicon oxide, aluminium oxide, zirconium oxide, titanium oxide, zirconium silicate or rare-earth metal oxide layer.

3. Method of preparing a composition of matter based on at least one element A chosen from alkaline-earth metals, on at least one element B chosen from aluminium, gallium and indium, on sulphur and on a dopant imparting to the composition luminescence properties, and comprising a mixture of predominantly an $AB_2S_4$-type crystallographic phase and a $B_2S_3$-type crystallographic phase, the method comprising the following steps:
   forming a solution or suspension containing salts or sols of the elements A, B and of the dopant is formed, in a proportion such that an atomic ratio B/(A+dopant) is at least 2.06;
   spray-drying the solution or suspension to form a product; and
   sulphurizing the product obtained in the previous step.

4. Method according to claim 3, wherein the product obtained from spray drying is sulphurized by reaction with carbon disulphide or with a mixture of hydrogen sulphide and carbon disulphide.

5. Method according to claim 4, wherein the reaction with carbon disulphide or with the aforementioned gas mixture is carried out at a temperature between 600° C. and 1000° C.

6. Method according to claim 3, wherein the salts comprise nitrates.

7. Method according to claim 3, wherein the atomic ratio is 2.06 to 2.25.

* * * * *